United States Patent [19]
Whitney et al.

[11] Patent Number: 5,972,413
[45] Date of Patent: Oct. 26, 1999

[54] PROCESS FOR COOKING CEREAL GRAINS

[75] Inventors: Anthony D. Whitney, Bishop's Storford; Raymond L. Hunter, Knebworth, both of United Kingdom

[73] Assignee: General Mills, Inc., Minneapolis, Minn.

[21] Appl. No.: 08/604,287

[22] Filed: Feb. 21, 1996

[30] Foreign Application Priority Data

Feb. 22, 1995 [GB] United Kingdom .................. 9503547

[51] Int. Cl.$^6$ ................................................ A23L 1/168
[52] U.S. Cl. ..................... 426/618; 426/455; 426/457; 426/460; 426/506; 426/507; 426/508; 426/619; 426/620
[58] Field of Search ..................... 426/455, 457, 426/460, 506, 507, 508, 549, 618, 619, 620

[56] References Cited

U.S. PATENT DOCUMENTS

| | | | |
|---|---|---|---|
| 1,446,200 | 2/1923 | Mulkey | 426/457 |
| 2,692,200 | 10/1954 | Olson . | |
| 2,884,327 | 4/1959 | Robbins . | |
| 2,928,743 | 3/1960 | Rutgers | 426/457 |
| 3,132,948 | 5/1964 | Smith et al. . | |
| 3,528,815 | 9/1970 | Trotter . | |
| 3,626,838 | 12/1971 | Gorakhpurwalla . | |
| 3,672,294 | 6/1972 | Blixrud et al. . | |
| 3,886,855 | 6/1975 | Nara . | |
| 3,886,856 | 6/1975 | Paugh . | |
| 3,998,978 | 12/1976 | Lawrence et al. | 426/457 |
| 4,155,293 | 5/1979 | Spiel et al. . | |
| 4,179,527 | 12/1979 | White | 426/508 |
| 4,561,347 | 12/1985 | Zaitu . | |
| 4,571,341 | 2/1986 | Sugimura . | |
| 4,614,660 | 9/1986 | Weibye . | |
| 4,699,797 | 10/1987 | Fast . | |
| 4,734,294 | 3/1988 | Spiel et al. . | |
| 4,899,648 | 2/1990 | Fast . | |
| 5,520,949 | 5/1996 | Lewis et al. | 426/618 |

FOREIGN PATENT DOCUMENTS 668288 3/1952 United Kingdom .

OTHER PUBLICATIONS

"Breakfast Cereals And How They Are Made," published by the American Association of Cereal Chemists, Inc., ed. by Robert B. Fast and Elwood F. Caldwell, pp. 35–39, 1990.

Primary Examiner—Lien Tran
Attorney, Agent, or Firm—John A. O'Toole; L. MeRoy Lillehaugen; Alan D. Kamrath

[57] ABSTRACT

A continuous method and apparatus for cooking cereal grains such as wheat is provided. The method comprises two stages, a first continuous pre-cooking stage wherein the grains are hydrated by heating in water at a temperature below 95° C. for a period of time sufficient to raise the moisture content of the grains to from about 28% to about 36% while allowing a substantial amount of starch to remain ungelatinized and a second continuous stage wherein the grains are heated in water at a temperature above about 95° C. for a period of time sufficient to substantially fully cook the grains.

19 Claims, 1 Drawing Sheet

PROCESS FOR COOKING CEREAL GRAINS

TECHNICAL FIELD

The present invention relates to a process for cooking cereal grains, for the production of ready-to-eat breakfast cereal products and to apparatus useful for cooking cereal grains.

BACKGROUND OF THE INVENTION

The production of ready-to-eat cereal products involves the step of cooking raw grain, typically wheat, oat, rice, barley, maize or rye. This is generally followed by one or more of a variety of further processing stages depending upon the type of end product. Examples of such processing includes tempering, flaking, shredding, extrusion, expansion and baking. Thus in the production of shredded wheat, whole wheat berries are cleaned, cooked in water to gelatinize the starch content, cooled, dried and tempered. The tempered cooked berries are shredded by passage between pairs of rollers, one smooth and one grooved, and the shreds formed into biscuits which are then baked to provide the finished ready-to-eat product.

Cooking of wheat on an industrial scale for breakfast cereal manufacture is conventionally carried out as a batch process in which raw, whole grains are cooked. For example, in the cooking of wheat for shredded wheat manufacture, wheat berries are heated in water at or near boiling point, typically for about 30 minutes.

Batch cooking is not however entirely satisfactory. A major disadvantage is the inconsistency of cook of the wheat which is often observed both within and between batches. Thus within a batch there are variations in moisture content between berries and, most importantly, variations in the degree of cooking. Furthermore, inconsistencies within a batch result from the filling and discharge times which means that not all the berries are subjected to elevated temperatures for the same period of time, and from the "dead spots" which exist within the cooking drum, i.e. areas where the stirring devices do not reach, for example near the outlet; any wheat berries which lodge in such areas will tend to be undercooked.

Undercooked berries tend to be hard and brittle; also biscuits made from shredded undercooked berries have a tendency to disintegrate and to rise inadequately during baking. Conversely, overcooked berries are sticky, have poor handling properties and are more difficult to shred. In the case of a batch process in which the proportion of undercooked or overcooked berries is intolerably high, an entire batch needs to be discarded as being unsuitable for further processing. There is thus a need for improved cooking processes which produce a more consistent product suitable for further processing to ready-to-eat breakfast cereals.

Continuous cooking has previously been proposed for ready-to-eat breakfast cereal. However operational problems were encountered and inconsistency of cook remained a problem. Continuous cooking is not in general industrial use in this technical area.

We have now developed a continuous cooking process for grain, particularly wheat, which can be used to produce a product of consistently high quality, in terms of texture and flavor, at least equal to that obtainable by batch methods.

SUMMARY OF THE INVENTION

Figure 1:
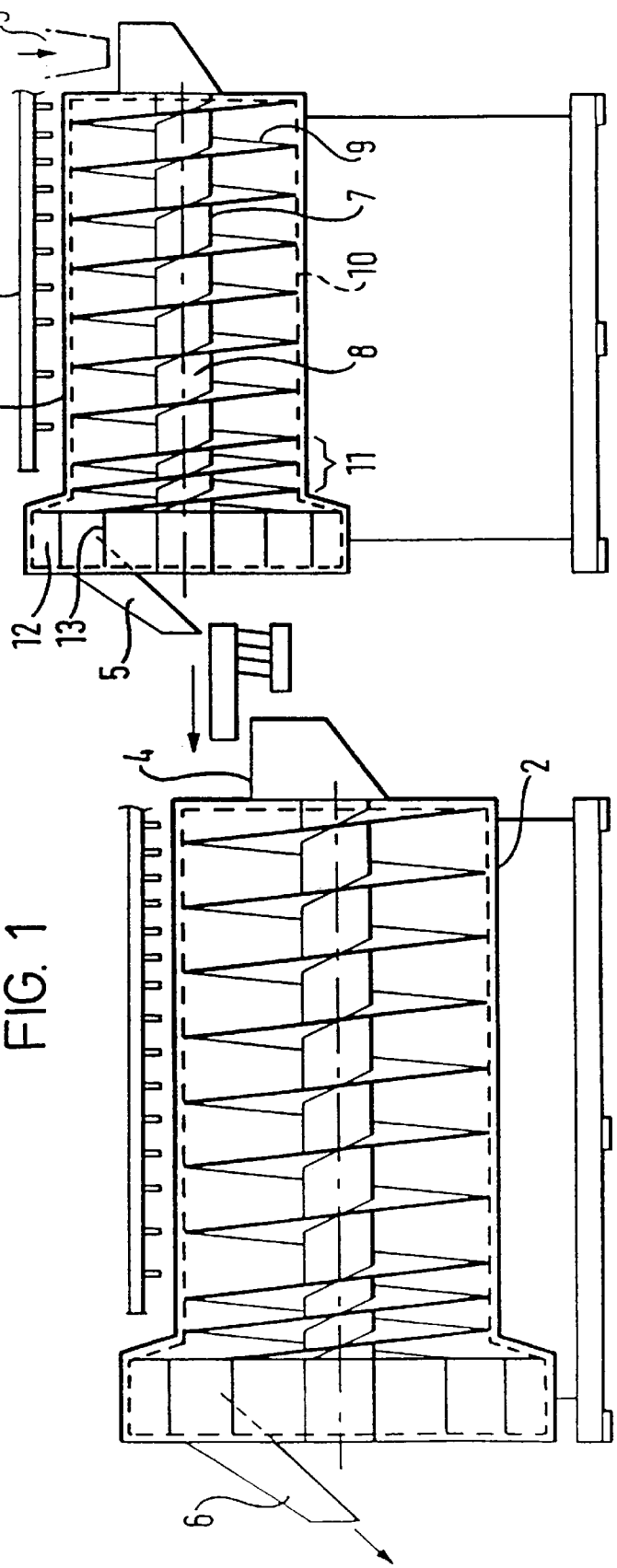
FIG. 1 is a side view in cross section of a two-stage cooking vessel combination of the present invention.

Thus according to one aspect, the present invention provides a continuous process for cooking cereal grains comprising a first continuous pre-cooking stage wherein said grains are hydrated by heating in water at a temperature below 95° C. for a period of time sufficient to raise the moisture content of said grains to from about 28% to about 36% while allowing a substantial amount of starch to remain ungelatinized and a second continuous stage wherein said grains are heated in water at a temperature above about 95° C. for a period of time sufficient to substantially fully cook said grains.

DETAILED DESCRIPTION OF THE INVENTION

The process of the present invention is suitable for many types of grains especially those used in the production of ready-to-eat cereals, and particularly wheat, which when cooked in this way is well suited to further processing, particularly shredding. Examples of grain which can be cooked according to the process include rice, oat, barley, maize and rye.

The process according to the invention is preferably carried out on whole grains, such as wheat berries but can also if desired be carried out on subparticles such as cracked berries (i.e. half berries or steel-cut, generally one third or one quarter berries). The cooked grain has the advantageous properties of consistency in moisture content and gelatinization of starch and the process can be operated continuously to provide berries which are both evenly and completely cooked.

The first stage operates so as effectively to "precondition" the grain by partial hydration while allowing a substantial amount of starch to remain ungelatinized and cooking to render it susceptible to complete cooking in the second stage. The temperature of the water in the first stage may be in the range of about 55° to about 95° C., preferably about 65° to 85° C. and more preferably about 70° to 80° C., especially about 75° C. To control and limit the degree of gelatinization while achieving the desired hydration, the grain berries may be heated in the first stage at the chosen temperature for a period of from about 5 to 20 minutes, preferably about 7 to 15 minutes and more preferably about 10 minutes; during which time the temperature of the berries is raised up to and maintained at the temperature of the water used for the pre-cooking step.

The combination of parameters used for the first stage is selected to achieve the desired hydration while leaving a substantial amount of starch ungelatinzed. Typically the grain berries will be soaked in the first stage to increase the moisture content to from about 28 to about 36% and preferably from about 30 to about 34%, especially about 32%. It is preferred to achieve or come close to achieving hydration throughout the berry although the inside of the berry will nonetheless be drier and hydrated to a lesser degree than the outside. It is desired in the first stage to obtain a balance between maximizing hydration while limiting gelatinization of starch. Although the hydration step preferably leaves the major part of the starch ungelatinized, a degree of gelatinization up to for example a level of about 60%, as measured by differential scanning calorimetry, may be tolerated without detriment to the effectiveness of the second stage of fully cooking the berries; preferably however, the degree of gelatinization in the first stage is below about 40%, more preferably below about 35% and particularly preferably below about 30%.

In the second stage, the partially hydrated berries, such as wheat berries, are heated until they are substantially fully cooked. The berries may be heated in water at a temperature of from about 95° to about 100° C., preferably about 98° C., for a time sufficient to achieve substantially consistent and even gelatinization throughout the berry. The cook time may depend at least in part upon a number of variables including the type and variety of grain berry, the relative hardness, the proportion of damaged or broken berries and on whether the batch contains any berries which have sprouted. Variations can occur according to the weather conditions at the time of harvest with for example wet conditions tending to encourage sprouting. Generally, however, the berries are cooked for from about 20 to about 40 minutes, preferably from about 25 to 35 minutes and more preferably from about 28 to 30 minutes. Fully cooked berries will have a moisture content of from about 44 to 51%, preferably from about 46 to 48%.

While elevated pressures can if desired be used for either or both cooking stages, the process according to the invention is preferably carried out at atmospheric pressure. The berries can be cooked optionally with additives for example vitamins, sugars, oils, minerals, colors, flavors according to the end product.

Batch processes in general have inherent disadvantages including poor control and inefficient energy utilization. A more minor drawback is the often incomplete discharge of the cooked grain from the cooking vessel.

The two-stage continuous cooking process according to the invention has the advantage over conventional batch processes that it is more easily controlled and the undesired variations in degree of cook and hydration within and between batches often experienced in batch processes can be substantially reduced. Continuous cooking provides the opportunity to more accurately and precisely control the degree of cook and produce a uniform population of cooked berries well suited for further processing. Monitoring discharged cooked berries enables adjustments to be easily made without substantial wastage of substandard cooked berries. In batch cooking, both undercooked and overcooked berries are produced, both of which are unsuited for further processing especially shredding.

Furthermore, continuous processes can be "environmentally friendly"; there may thus be more efficient energy usage as compared to batch processes and operating time may be more efficiently utilized since there is no lost time for periodically filling and emptying the cooking vessel. Furthermore, at least some of the cooking water may be recycled.

In addition, the throughput of a continuous process can readily be integrated with the further process steps such as shredding which are conventionally operated in a continuous manner, with further economy of both time and space.

Both the precooking and the cooking stages may be carried out in a variety of vessels adapted for continuous treatment of particulate solid matter such as vegetable or cereal products with water at elevated temperatures. It has however been found desirable that the grains should be substantially completely contained as they progress through the cooking vessel by means of a perforated basket which serves to protect the grains from contact with the inner wall of the vessel.

Thus according to a further aspect, the present invention provides a vessel for continuous cooking of cereal grains comprising a cooking chamber, screw conveying means within the chamber adapted in use to progress the grains through the chamber and a perforated basket arranged for containing the grains within the chamber; the conveying means and perforated basket being coaxially arranged so as in use to rotate together within the chamber and thereby to progress the grains through the chamber.

It is thus a feature of cooking vessels according to the invention that they are provided with a perforated rotating basket which encloses the cereal grains as they progress through the chamber. The rotation of the screw conveying means and the basket in use provides continuous movement of the grains within the cooking water.

In a preferred embodiment, the basket is cylindrically shaped and disposed around the screw conveyor with no gap between the flight tips of the screw conveyor and the inner cylindrical surface of the basket. The flights of the screw conveyor and the surrounding basket thus together define a flow path for the grains through the chamber. It is an advantage of the apparatus of the invention that the grains are not subjected to shearing forces of the kind which would be applied if for example the screw conveyor were to be rotating within the chamber with no basket provided and with a gap between the flights of the screw conveyor and the inner wall of the chamber.

In another preferred embodiment the axis of the chamber conveying means and basket is substantially horizontal.

Water for cooking can be heated and introduced in a variety of ways. In a preferred embodiment, the water is steam heated and injected into the chamber in the space between the outer surface of the basket and the chamber wall, preferably at a plurality of points parallel to the axis of the chamber This is conveniently accomplished by means of a manifold.

The spacing of the screw flights may be constant through the chamber or it may vary. In general, it is preferred that any variation takes the form of an increase in spacing from the inlet end towards the outlet end of the chamber so that, as the bulk volume of the grains increases as they move through the chamber, so the flow path widens to maintain a uniform depth of material in the chamber. However, in a particularly preferred embodiment, there is a reduction in spacing of the screw flights immediately adjacent the discharge end with the flow path defined by the screw flights splitting so that the grains exit the chamber through two or more and preferably three discharge ports. These arrangements for providing a plurality of discharge ports are known, with for example the arrangement for three discharge ports being known as a triple discharge screw. Such arrangements have the advantage of providing for finer control of the discharge rate.

The lattice spacing and perforation size in the perforated basket will, of course, depend at least in part, on the actual product to be cooked. In the case of wheat berries, the perforations for example conveniently have diameters of about 1 mm, with about a 2 mm spacing.

In one embodiment, the cooking vessel may be provided with means for at least partially recycling the water. With appropriate design modifications, either one or both of the cooking vessels can if desired be operated at elevated pressures.

The pre-cooked or cooked product can be moved on after discharge from the chamber in a variety of ways. Means can thus be provided to separate the product from the cooking water for example by scooping or sieving. In one embodiment, the discharge port or ports feed the product into a zone of the chamber in which a rotating Ferris wheel operates to scoop up the product as it settles and carry it upwards out of the water. Conveniently the paddles may be perforated which helps to drain the liquid. The paddles may conveniently transfer the product to a discharge chute for further processing.

The simple construction of cooking vessels according to the invention facilitates easy cleaning of the equipment. This is a particular advantage in the case of cereal grain which tends to become sticky upon cooking and which may adhere to the working parts of the cooker. It is particularly desirable to remove material adhering to the perforated basket and this can be done during continuous operation by directing the hot water inlets, preferably provided with spray nozzles, on to the outside surface of the perforated basket as it rotates within the chamber. The cleaning effect is improved if the hot water inlets inject the water under force and counter to the direction of movement of the surface of the basket as it rotates.

In the process of the invention, the two cooking stages are conveniently carried out in separate vessels which are connected to permit continuous transfer of product from one to another. In a preferred embodiment, each of the two vessels are of similar design, preferably of the aforementioned design, although they need not be of the same dimension. Indeed, the two vessels will generally be of different size if the residence time of the product in each cooker differs. Thus for example, if the time required for the precooking stage is approximately one third of that required for the second cooking stage, then the first vessel used for the pre-cooking stage conveniently has about one third of the volume of that used for the second cooking stage.

Thus viewed from a further aspect, the present invention provides an apparatus for carrying out the process of the invention comprising an assembly of two cooking vessels according to the invention wherein connecting means are provided for transferring the product from the discharge outlet of the first cooker to the inlet of the second cooker.

Any suitable connecting means may be used for transferring the product between cookers and intermediate stages may be included. In a preferred and simple embodiment, the product from the first stage is transferred directly to the inlet of the second stage. Direct transfer helps minimize temperature losses in the cooked product.

In another preferred embodiment, product from the first stage is introduced into the second stage cooker by means of a water chute. This helps carry the product into the vessel and ensures that the partially cooked grain, particularly wheat which tends to be sticky, is not held up.

An embodiment of the invention will now be described by way of example only with reference to the accompanying drawing in which FIG. 1 shows a schematic cross sectional view of two cooking vessels according to the invention arranged for carrying out the cooking of cereal grain, such as wheat, according to the invention.

Referring to the drawing, there is shown a first stage cooking vessel 1 having an inlet 3 at one end for the input of raw wheat and an outlet 5 at the other end for discharge of preconditioned wheat, and a second stage cooking vessel 2 having an inlet 4 at one end for the input of preconditioned wheat from the first vessel and an outlet 6 at the other end for discharge of fully cooked wheat. Each vessel 1,2 has a screw conveyor 7 located therein comprising a shaft 8 and generally evenly spaced flights 9 which, when operating, serve to transfer the grain through the cooking vessel. Within each vessel 1,2 there is a perforated basket 10, coaxial with the screw shaft 8 and rotatable therewith, which abuts the rims of the screw flights 9 and extends closely adjacent the end walls of the vessel essentially to contain the wheat. A triple discharge screw 11 comprising two narrowly spaced flights 9 is provided adjacent the discharge end of each vessel 1,2 and helps to evenly spread the discharge. Ferris wheels 12 at the discharge of each vessel 1,2, comprise a series of perforated scoops 13 arranged around its circumference and are rotatable with the basket and shaft. These open out at one point onto discharge chutes 5,6 which direct the processed material out of the vessel 1,2.

When in use, each tank 1,2 is filled with water to the depth of the shaft 8 by means of a manifold 14. The water is recirculated continuously and the level maintained by means of overflow weirs and ball-valves (not shown). The water temperature is maintained by means of a temperature probe, controller and modulating steam valve (not shown).

The following example illustrates the invention.

EXAMPLE

This example was carried out using the apparatus of FIG. 1.

Raw wheat berries with a moisture content of 14%, were cleaned and loaded at room temperature at a rate of 1000 kg/h via the infeed 3 into the first stage cooking vessel 1 of volume 1.2 cubic meters so as to approximately half fill the vessel (i.e. approximately 0.6 cubic meters of water). Water was injected into vessel 1 at a temperature of 75° C. The screw conveyor 7 was rotated continuously at 0.83 rpm, to convey the wheat through the vessel in 10 minutes. This raised the moisture content of the wheat to 320° C.

The pre-conditioned wheat was discharged from the first vessel 1 into the second cooking vessel 2 of volume 3.0 cubic meters again so as to approximately half fill the vessel (i.e. approximately 1.5 cubic meters of water) into which water was injected at 98° C. The second vessel 2 has a longer path length than the first and rotation of the screw conveyor 7 at 0.34 rpm conveyed the wheat in 28 minutes through the vessel 2 to the discharge outlet 6. Fully cooked wheat with a moisture content of 47% was discharged from the cooker at a rate of 1600 kg/h, for further processing.

We claim:

1. A continuous process for cooking cereal grains, comprising the steps of:
    A. hydrating cereal grains by heating in hot water at a temperature from about 55° to below 95° C. for a period of time sufficient to raise the moisture content of said grains to from about 28% to about 36% and to gelatinize some of the starch wherein said gelatinization is not more than 60% and an amount of starch remains ungelatinized to form hydrated partially gelatinized cereal grains; and
    B. cooking the hydrated cereal grains in water with said water being at a temperature above about 95° C. for a period of time sufficient to substantially fully cook said grains, wherein the first step is practiced in a first vessel whilst the second step is practiced in a second vessel which is connected to the first vessel to permit continuous transfer of the grains from the first vessel to the second vessel.

2. The process of claim 1 wherein the temperature in the first step ranges from about 65° to about 85° C.

3. The process of claim 2 wherein the temperature in the first step ranges from about 70° to about 80° C.

4. The process of claims 3 wherein the grains are heated in said first step for from about 5 to about 20 minutes.

5. The process of claim 4 wherein said first step heating is from about 7 to about 15 minutes.

6. The process of claim 5 wherein said grains are hydrated in said first step to a moisture content of from about 30% to about 34%.

7. The process of claim 6 wherein the degree of gelatinization of the cereal in the first step is below about 40%.

8. The process of claim 7 wherein the degree of gelatinization is below about 35%.

9. The process of claim 8 wherein the degree of gelatinization is below about 30%.

10. The process of claim 1 wherein the temperature of the water in said second stage is from about 95° C. to about 100° C.

11. The process of claim 7 wherein in said second step the grains are cooked for from about 20 to about 40 minutes.

12. The process of claim 11 wherein said second step cooking is from about 25 to about 35 minutes.

13. The process of claim 12 wherein said second step cooking is from about 28 to about 30 minutes.

14. The process of claim 13 wherein said grains are cooked in said second step to a moisture content of from about 44 to about 51%.

15. The process of claim 14 wherein said grains are cooked in said second step to a moisture content of from about 46 to about 48%.

16. The process of claim 15 wherein at least one step is practiced at atmospheric pressure.

17. The process of claim 16 wherein said method is followed by one or more further processing steps selected from the group consisting of tempering, flaking, shredding, extrusion, expansion and baking.

18. The process of claim 17 wherein the grains are selected from the group consisting of wheat, rice, oat, barley, maize and rye.

19. The process of claim 6 wherein at least one step is practiced by advancing the grain in a helical path along the axial length of a cylindrical horizontally oriented vessel disposed within which is the hot water.

* * * * *